United States Patent [19]
Sandhu et al.

[11] Patent Number: 6,049,411
[45] Date of Patent: Apr. 11, 2000

[54] OPTICAL IMAGER FOR BIREFRINGENT DETECTOR ACOUSTIC IMAGING SYSTEMS

[75] Inventors: Jaswinder S. Sandhu, Buffalo Grove; Witold J. Popek, Mt. Prospect; Hongui Wang, Palatine, all of Ill.

[73] Assignee: SanTec Systems Inc, Wheeling, Ill.

[21] Appl. No.: 09/172,347

[22] Filed: Oct. 14, 1998

[51] Int. Cl.$^7$ .................................................. G02F 1/11
[52] U.S. Cl. ......................... 359/285; 356/364; 356/365
[58] Field of Search ............................ 359/285; 356/365, 356/364, 366

[56] References Cited

U.S. PATENT DOCUMENTS

| | | | |
|---|---|---|---|
| 3,597,043 | 8/1971 | Dreyer | 350/149 |
| 3,745,812 | 7/1973 | Korpel | 73/67.5 R |
| 3,831,434 | 8/1974 | Greguss | 73/67.5 |
| 4,338,821 | 7/1982 | Dion | 73/603 |
| 4,379,408 | 4/1983 | Sandhu | 350/330 |
| 4,393,712 | 7/1983 | Sandhu | 73/603 |
| 4,492,107 | 1/1985 | Sandhu | 73/570 |
| 4,506,550 | 3/1985 | Sandhu | 73/603 |
| 4,530,242 | 7/1985 | Sandhu | 73/625 |
| 4,651,567 | 3/1987 | Sandhu | 73/603 |
| 4,652,086 | 3/1987 | Sandhu | 350/330 |
| 4,679,436 | 7/1987 | Sandhu | 73/603 |
| 4,788,865 | 12/1988 | Sandhu | 73/603 |
| 4,905,202 | 2/1990 | Robillard | 367/8 |
| 5,130,843 | 7/1992 | He et al. | 359/285 |
| 5,796,003 | 8/1998 | Sandhu | 73/603 |

OTHER PUBLICATIONS

Sandhu et. al. "Ultrasonic inspection of tight–radii in composites using acoustography," Proceedings of SPIE, vol. 3396 pp. 169–179, 1998.

Sandhu et. al. "Recent Progress on Ultrasonic NDE Using Acoustography," Second Conference on NDE Applied to Process Control of Composite Fabrication, Nondestructive Testing Information Analysis Center, pp. 229–237, Austin, TX, 1996.

Sandhu et. al. "Acoustography for rapid ultrasonic inspection of composites," Proceedings of the Nondestructive Evaluation Techniques for Aging Infrastructure & Manufacturing, Scottsdale, AZ, Pub. SPIE, Dec. 1996.

Sandhu et. al. "Acoustography," Special nondestructive testing methods, Nondestructive Testing Handbook, 2nd ed., P. O. Moore and P. McIntire eds., 9, pp. 278–284, American Society for Nondestructive Testing, Columbus OH, 1995.

*Primary Examiner*—Georgia Epps
*Assistant Examiner*—Timothy Thompson
*Attorney, Agent, or Firm*—Don Moyer

[57] ABSTRACT

Light from a collimated light source which is incident on a birefringent detector at a predetermined optimum angle interacts with the birefringent detector and is viewed by an imaging transducer in order to produce an image which shows changes in the birefringence of the birefringent detector caused by acoustic energy which has interacted with an object, the image thus showing heterogeneities in the object.

9 Claims, 2 Drawing Sheets

OPTICAL IMAGER FOR BIREFRINGENT DETECTOR ACOUSTIC IMAGING SYSTEMS

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The invention is an optical imager for use in birefringent detector acoustic imaging systems. In birefringent detector acoustic imaging systems acoustic energy produced by an acoustic source is transmitted through a coupling medium, interacts with an object being imaged, is transmitted through the coupling medium, interacts with a birefringent medium contained in a birefringent detector chamber with the acoustic energy changing the birefringence of the birefringent medium so that an image can be formed by an optical imager, whereupon the image can be processed by a data processor and input to an image output device.

Several features of birefringent detector acoustic imaging systems have been disclosed by Sandhu in U.S. Pat. Nos. 4,379,408, 4,393,712, 4,492,107, 4,506,550, 4,530,242, 4,652,086, 4,651,567, 4,679,436, 4,788,865, and 5,796,003 (which are incorporated herein by reference); by Dreyer in U.S. Pat. No. 3,597,043, by Greguss in U.S. Pat. No. 3,831,434, by Dion in U.S. Pat. No. 4,338,821, by Robillard in U.S. Pat. No. 4,905,202; and by Sandhu et. al. in: "Ultrasonic inspection of tight-radii in composites using acoustography," Proceedings of SPIE, Vol. 3396 pp. 169–179, 1998; "Recent Progress on Ultrasonic NDE Using Acoustography," Second Conference on NDE Applied to Process Control of Composite Fabrication, Nondestructive Testing Information Analysis Center, pp. 229–237, Austin, Tex., 1996; "Acoustography for rapid ultrasonic inspection of composites," Proceedings of the Nondestructive Evaluation Techniques for Aging Infrastructure & Manufacturing, Scottsdale, Ariz., Pub. SPIE, December 1996; "Acoustography," Special nondestructive testing methods, Nondestructive Testing Handbook, $2^{nd}$ ed., P. O. Moore and P. McIntire eds., 9, pp. 278–284, American Society for Nondestructive Testing, Columbus Ohio, 1995.

Outstanding problems have prevented workers from devising commercially useful systems. Systems had not been sufficiently sensitive so that useful images could be obtained with sufficiently low cost in time and money. The optical imager shown here improves the optical imaging by having all of the rays of the light interacting with the birefringent detector be at the same predetermined optimum angle relative to the normal axis of the birefringent detector so that useful images are obtained at sufficiently low cost in time and money. This improvement is not suggested in any prior art nor in any combination of prior art.

SUMMARY OF THE INVENTION

Objects of this invention comprise requirements listed in the following imperatives. Make an optical imager for use in birefringent detector acoustic imaging systems. Make an optical imager which forms an optical image from light incident on a birefringent detector with all of the light rays being incident at the same optimum angle relative to the normal axis of the birefringent detector. Provide a source of collimated light in the optical imager so that the optical imager transmits plane waves of light energy onto the full useful surface of a birefringent detector. Orient the rays of the collimated light incident on the surface of the birefringent detector to a predetermined optimum angle relative to the normal axis of the birefringent detector, the predetermined optimum angle having been predetermined as the angle which produces the most useful optical image for the specific components used in the birefringent detector acoustic imaging system. Use an imaging transducer to output an electrical signal corresponding to the optical image conveyed by light which has interacted with the birefringent detector. Use a data processor to process the output from the imaging transducer to drive image output devices such as computer monitors and printers.

Other objects will be comprehended in the drawings and detailed description, which will make additional objects obvious hereafter to persons skilled in the art.

In summary one embodiment of this invention is an optical imager used in a birefringent detector acoustic imaging system, the optical imager having a source of collimated light providing plane waves of light incident on a birefringent detector at a predetermined optimum angle relative to a normal axis of the birefringent detector, and the optical imager having an imaging transducer which views the light energy which has interacted with the birefringent detector and outputs an electrical signal to a data processor.

Other equivalent embodiments will be comprehended in the drawings and detailed description, which will make additional equivalent embodiments obvious hereafter to persons skilled in the art.

DESCRIPTION OF THE PREFERRED EMBODIMENTS

Figure 1:
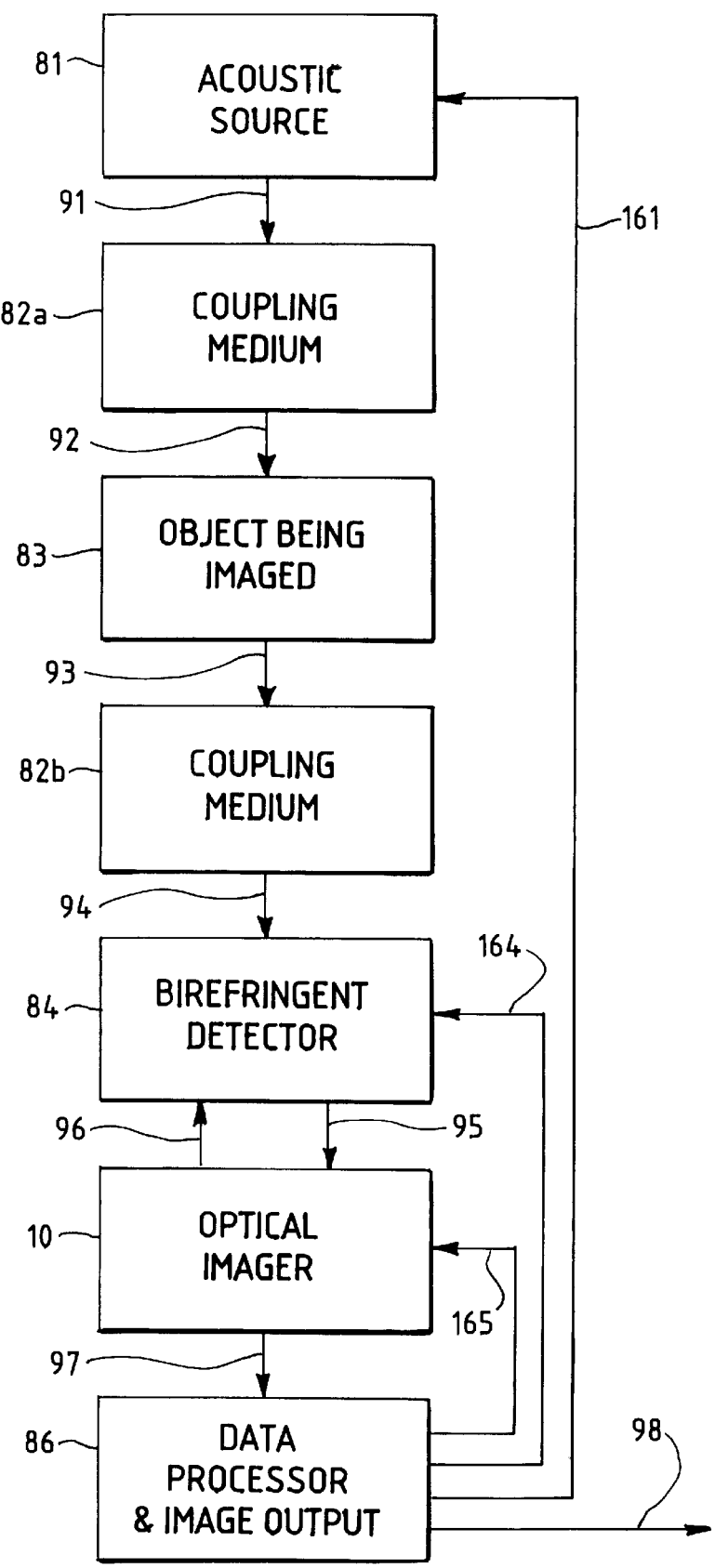
FIG. 1 is a block diagram showing elements and connections which define acoustic imaging systems based on a birefringent detector.

FIG. 1 shows elements and connections which define an acoustic imaging system using a birefringent detector. The key subsystems are an acoustic source 81, a birefringent detector 84, an optical imager 10, and a data processor 86. The acoustic imaging system uses a birefringent detector because the birefringent detector reacts to acoustic energy over a wide field which can be as large as an area five centimeters by five centimeters and larger. Thus a corresponding area of an object can be imaged at once by the birefringent detector.

The acoustic source 81 uses a transducer which converts electrical energy to acoustic energy 91 which is transmitted via a coupling medium 82a. Acoustic energy transmitted via the coupling medium is incident 92 on an object being imaged 83. Piezoelectric transducers are preferred to convert electric energy to acoustic energy. Though water is the preferred coupling medium, various gels and other substances can be used in situations where the use of water would be difficult.

The intensity of acoustic energy which has interacted with parts of the object 83 which contain heterogeneities, such as impurities and defect boundaries, is different from the intensity of acoustic energy which has interacted with parts of the object without heterogeneities. Thus, the intensity of post-object acoustic energy 93 varies in accordance with the nature of the parts of the object with which the post-sample acoustic energy had interacted. The post-object acoustic energy 93 is also transmitted via the coupling medium 82b until the transmitted post-object acoustic energy is incident 94 on the birefringent detector 84.

The birefringent detector 84 is sensitive to the variations in intensity of the acoustic energy over the field of the birefringent detector, where the field of the birefringent detector can have dimensions along a first lateral axis and along a second, orthogonal lateral axis as large as five centimeters by five centimeters and larger. Post-object acoustic energy which interacts with the birefringent detector 84 changes the birefringence of the birefringent detector so that variations in the birefringence across the field of the birefringent detector correspond to the heterogeneities in the object which had been encountered by the acoustic energy which interacts with the birefringent detector.

Variations in the birefringence across the field of the birefringent detector are imaged by the optical imager 10. Light 95 which has passed through a first polarizer is incident on the birefringent detector and interacts with the birefringent detector. Post-birefringent detector light 95 passes through a second polarizer in an imaging transducer which converts the light to an electrical signal 97. The planes of polarization of the first and second polarizer are perpendicular so that portions of the birefringent detector where the birefringence of the detector is least changed by post-sample acoustic energy produce the darkest image and portions of the birefringent detector where the birefringence has been most changed by post-sample acoustic energy produce the brightest image. In cases where it is useful for the planes of polarization to be at an angle which is not ninety degrees the same brightest and darkest parts of the image bear the same relationship to the acoustic energy.

The electrical signal 97 output by the optical imager 10 is input to a data processor 86 which produces an image output signal 98 for image output devices (not shown) such as computer monitors and printers. The image output device thus shows the heterogeneities in the object encountered by the post-object acoustic energy which interacts with the birefringent detector. The data processor can also send a control signal 161 to the acoustic source 81, send a control signal 164 to the birefringent detector 84, and send a control signal 165 to the optical imager.

Various examples of birefringent detector acoustic imaging systems and of the several key subsystems—the acoustic source, the birefringent detector, the optical imager, and the data processor—which comprise birefringent detector acoustic imaging systems have been described in prior art disclosed above. Prior art birefringent detector acoustic imaging systems however have not been able to produce useful images at an acceptable cost in time and money. The invention shown here improves the optical imager and does produce useful images at an acceptable cost in time and money.

The discovery underlying this invention is the discovery of a large gain in sensitivity of the birefringent detector acoustic imaging system which is possible by having all of the rays of light energy incident on the birefringent detector be at the same predetermined optimum angle relative to the normal axis of the birefringent detector. The optimum angle depends in complicated ways on various specific details of the birefringent detector chosen for the intended uses of the birefringent detector acoustic imaging systems and there are many variations in birefringent detectors optimized for various uses. Thus, it was thought that the cost of predetermining the optimum angle and configuring a system using this predetermined optimum angle would not produce enough benefit to justify the increase in the cost of an optical imager.

It had been common practice to use incident light which is not collimated with the central ray parallel to the normal axis of a birefringent detector. When the central ray was moved to a non-zero angle relative to the normal axis of the birefringent detector in order to reduce the complexity of the optical system, then unwanted reflection polarization effects were seen. When an optical system was reconfigured to use collimated incident light in order to control these reflection polarization effects, then it was discovered that the angle of the incident light relative to the normal axis of the birefringent detector could be easily optimized experimentally. The unexpected ease of predetermining the optimum angle and the unexpectedly large increase in usefulness of the image yielded a birefringent detector acoustic imaging system which produces the long sought useful images with a reduction in the cost of the optical imager.

Figure 2:
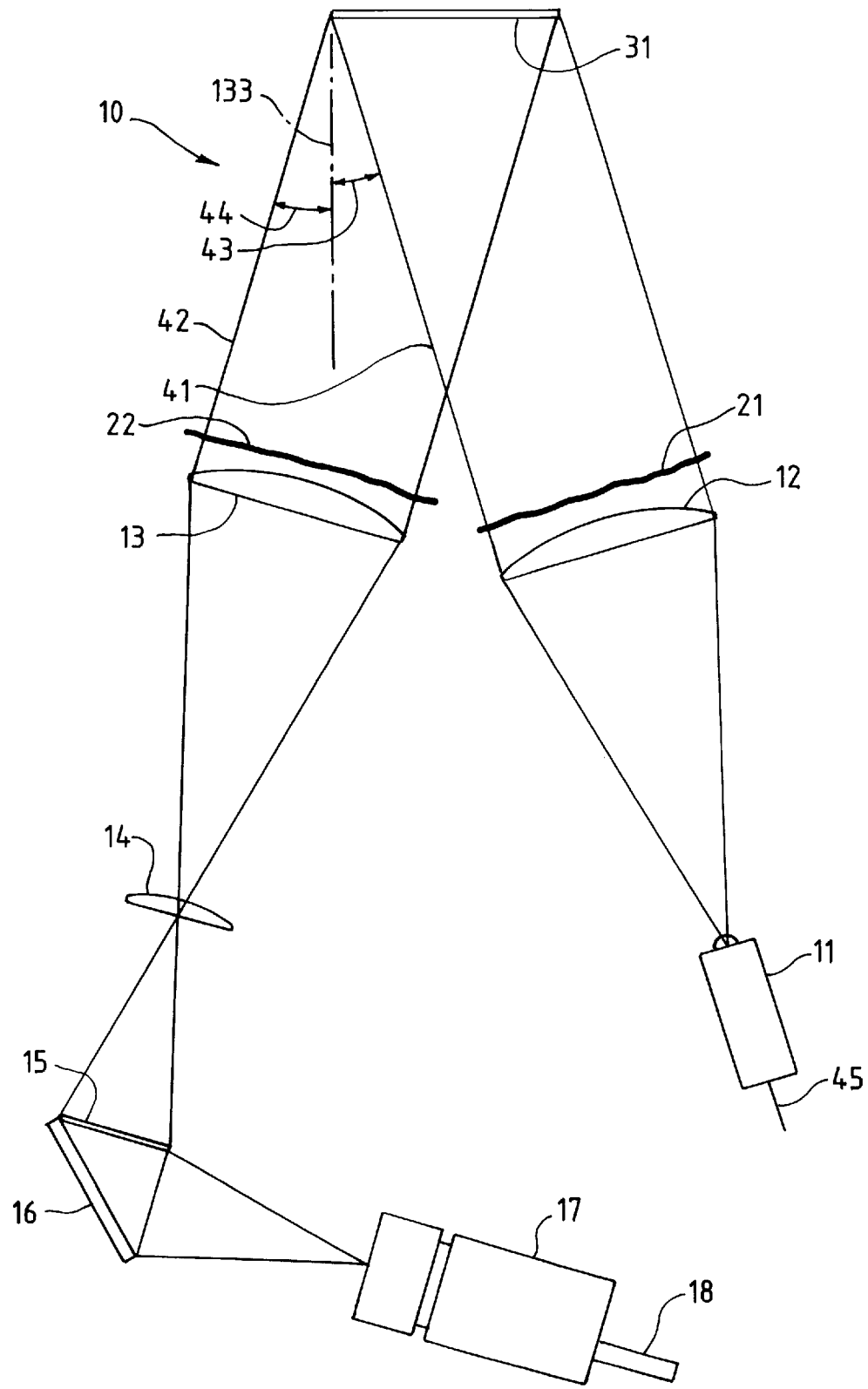
FIG. 2 is a schematic view of the optical imager.

Details of the optical imager 10 are shown in FIG. 2. The birefringent detector 31 is represented by a view looking along the first lateral axis at the second, orthogonal lateral axis of the birefringent detector so that the normal axis 133 of the birefringent detector is in the plane of the drawing. A lamp 11 converts electrical energy 45 into the light to be incident on the birefringent detector 31, and a first lens 12 collimates this light so that all of the rays of incident light 41 are incident at the same angle 43 relative to the normal axis 133 of the birefringent detector. A first polarizer 21 is located in this beam of light so that the incident light is linearly polarized.

The incident light interacts with the birefringent detector, and then post-interaction light rays 42 pass through a second polarizer 22 and through a second lens 13 which refocuses the post-interaction light. Though the post-interaction light 42 could be transmitted through the side of the birefringent detector away from the incident light, the preferred orientation shown here has the post-interaction light 42 reflected back to the incident side with all of the post-interaction rays 42 at the angle 44 relative to the normal axis 133 of the birefringent detector 31.

A third lens 14 produces an image through a diffuser 15. The diffuser 15 is used so that the image through the diffuser is an image of the field of the birefringent detector and not of the lamp 11. The plane of polarization of the second polarizer 22 is perpendicular to the plane of polarization of the first polarizer 21 so that the parts of the image through the diffuser which correspond to parts of the birefringent detector where the birefringence has been least changed by acoustic energy are darkest and parts of the image through the diffuser which correspond to parts of the birefringent detector where the birefringence has been most changed by acoustic energy are brightest. In cases where it is useful for the planes of polarization to be at an angle which is not ninety degrees the same brightest and darkest parts of the image bear the same relationship to the acoustic energy. The image through the diffuser is reflected by a mirror 16 and is viewed by a camera 17 which outputs an electrical signal 18 which is input to frame grabber hardware (not shown) incorporated in the data processor 86.

The pre-birefringent elements—the lamp through the first polarizer—comprise a collimated light source which provides collimated light incident on a birefringent detector at an incident angle which is a predetermined optimum angle. Many variations of these elements, and many other combinations of elements, can also comprise the collimated light source. The long sought useful images result from using collimated light incident on the birefringent detector at the predetermined optimum angle relative to the normal axis of the birefringent detector.

The post-birefringent detector elements—the second polarizer through the frame grabber hardware—comprise an imaging transducer which converts an image conveyed by the light into an electrical signal which can be processed by a data processor and displayed on image output devices. Many variations of these elements, and many other combinations of elements, can also comprise the imaging transducer. All that is required is that the imaging transducer produce an image which shows the variations of the birefringence of the birefringent detector produced by acoustic energy. This image can be presented in various data processed forms using false colors for example and in numerical forms for example. Images which are saved in some tangible form so that they can be reviewed are preferred, but the image could be an image which is viewed directly by a user using an alternative form of the imaging transducer which does not have the electronic components.

The optimum angle for a specific birefringent detector depends on the properties of that specific birefringent detector. The choice of a specific birefringent detector for a birefringent detector acoustic imaging system depends on properties of objects to be imaged, on properties heterogeneities which need to be detected, and on the conditions of use. When a specific birefringent detector has been chosen, then the optimum angle relative to the normal axis of the birefringent detector must be predetermined as a property of that specific birefringent detector so that a system can be configured using this predetermined optimum angle.

The optimum angle is predetermined experimentally by imaging a test beam of acoustic energy and varying the angle relative to the normal axis of the specific birefringent detector chosen until the beam is best seen. As experimental data of optimum angles for various specific birefringent detectors accumulates the optimum angle for a specific birefringent detector also can be determined at least approximately by interpolations from the accumulated data. The optimum angle can also be predetermined at least approximately by calculations from the dynamics of the birefringent media.

The collimated light source, and the imaging transducer can be configured in the acoustic imaging system so that the angle at which the collimated light is incident on the birefringent detector is variable. In this case the birefringent detector can be changed to suit a particular imaging need and the collimated light source can be adjusted to a new predetermined optimum angle which is predetermined relative to the changed birefringent detector.

Useful images have been produced using an optical imager with the lamp being a ten watt Gilway halogen lamp; the first lens and the second lens being 100 millimeter diameter, 200 millimeter focal length lenses; the third lens being a 50 millimeter diameter, 100 millimeter focal length lens; the diffuser being a 60 degree Physical Optics Corporation light shaping diffuser; the camera being a Sony CCD camera, and the predetermined optical angle for the birefringent detector used being 16 degrees. Achieving useful results does not depend on the specific components of the collimated light source and the imaging transducer, but depends strongly on providing collimated light at the predetermined optimum angle.

Other equivalent forms for the collimated light source and the imaging transducer, other equivalent ways to predetermine the optimum angle, other equivalent ways to configure the optical imager in a birefringent detector acoustic imaging system, and other equivalent forms for the key elements of the birefringent detector acoustic imaging system will be obvious hereafter to persons skilled in the art. Therefore this invention is not limited to the particular examples shown and described here.

We claim:

1. In an acoustic imaging system using a birefringent detector, an optical imager comprising:

a collimated light source, the collimated light source providing a plane wave of light extending over the birefringent detector at an incident angle relative to the birefringent detector, the incident angle being a predetermined optimum angle, the optimum angle being birefringence dependent; and an imaging transducer which converts light which has interacted with the birefringent detector into an image which shows variations of birefringence of the birefringent detector.

2. The optical imager of claim 1 wherein the collimated light source is varied so that light is incident at a second incident angle.

3. In an acoustic imaging system using a birefringent detector, an optical imager comprising:

means for providing collimating light with a plane wave extending over the birefringent detector at an incident angle relative to the birefringent detector, the incident angle being a predetermined optimum angle, the optimum angle being birefringence dependent; and means for converting light which has interacted with the birefringent detector into an image which shows variations of birefringence of the birefringent detector.

4. The optical imager of claim 3 wherein the means for providing collimated light is varied so that light is incident at a second incident angle.

5. A method which forms an optical image in an acoustic imaging system using a birefringent detector, the method comprising:

predetermining an optimum angle for collimated light with a plane wave extending over the birefringent detector to be incident on the birefringent detector, the optimum angle being birefringence dependent;

providing the collimated light with a plane wave extending over the birefringent detector at an incident angle relative to the birefringent detector, the incident angle being the predetermined optimum angle;

converting light which has interacted with the birefringent detector into an image which shows variations of birefringence of the birefringent detector.

6. The method of claim 5 wherein the step of predetermining the optimum angle is accomplished by experiments.

7. The method of claim 5 wherein the step of predetermining the optimum angle is accomplished by interpolations from accumulated data.

8. The method of claim 5 wherein the step of predetermining the optimum angle is accomplished by calculations from the dynamics of the birefringent detector.

9. The method of claim 5 further comprising the step of varying collimated light source so that light is incident at a second incident angle.

* * * * *